United States Patent [19]

Kashida et al.

[11] Patent Number: 4,807,057
[45] Date of Patent: Feb. 21, 1989

[54] DATA RECORDING APPARATUS

[75] Inventors: Motokazu Kashida, Tokyo; Masahiro Takei, Kanagawa; Kouji Takahashi, Kanagawa; Toshiyuki Masui, Kanagawa; Tsutomu Fukatsu, Kanagawa; Kenichi Nagasawa, Kanagawa, all of Japan

[73] Assignee: Canon Kabushiki Kaisha, Japan

[21] Appl. No.: 203,538

[22] Filed: May 23, 1988

Related U.S. Application Data

[63] Continuation of Ser. No. 826,793, Feb. 6, 1986, abandoned.

[30] Foreign Application Priority Data

Feb. 13, 1985 [JP] Japan .................................. 60-025714
Feb. 25, 1985 [JP] Japan .................................. 60-035609

[51] Int. Cl.$^4$ .......................... G11B 5/00; G11B 5/09; G11B 15/18

[52] U.S. Cl. ...................................... 360/32; 360/49; 360/72.2

[58] Field of Search ......................................... 360/72.2

[56] References Cited

U.S. PATENT DOCUMENTS 4,389,681 6/1983 Tanaka et al. .......................... 360/27
4,622,600 11/1986 Okamoro et al. ...................... 360/32

Primary Examiner—Vincent P. Canney
Attorney, Agent, or Firm—Toren, McGeady & Associates

[57] ABSTRACT

A data recording apparatus samples main information signals and records, on a recording medium, a sequence of data consisting of first binary data of an "n" number of bits and second binary data which also consists of the "n" number of bits including additional binary data relative to additional information not exceeding three bits and a predetermined "m" number of bits which do not simultaneously become "0".

13 Claims, 10 Drawing Sheets

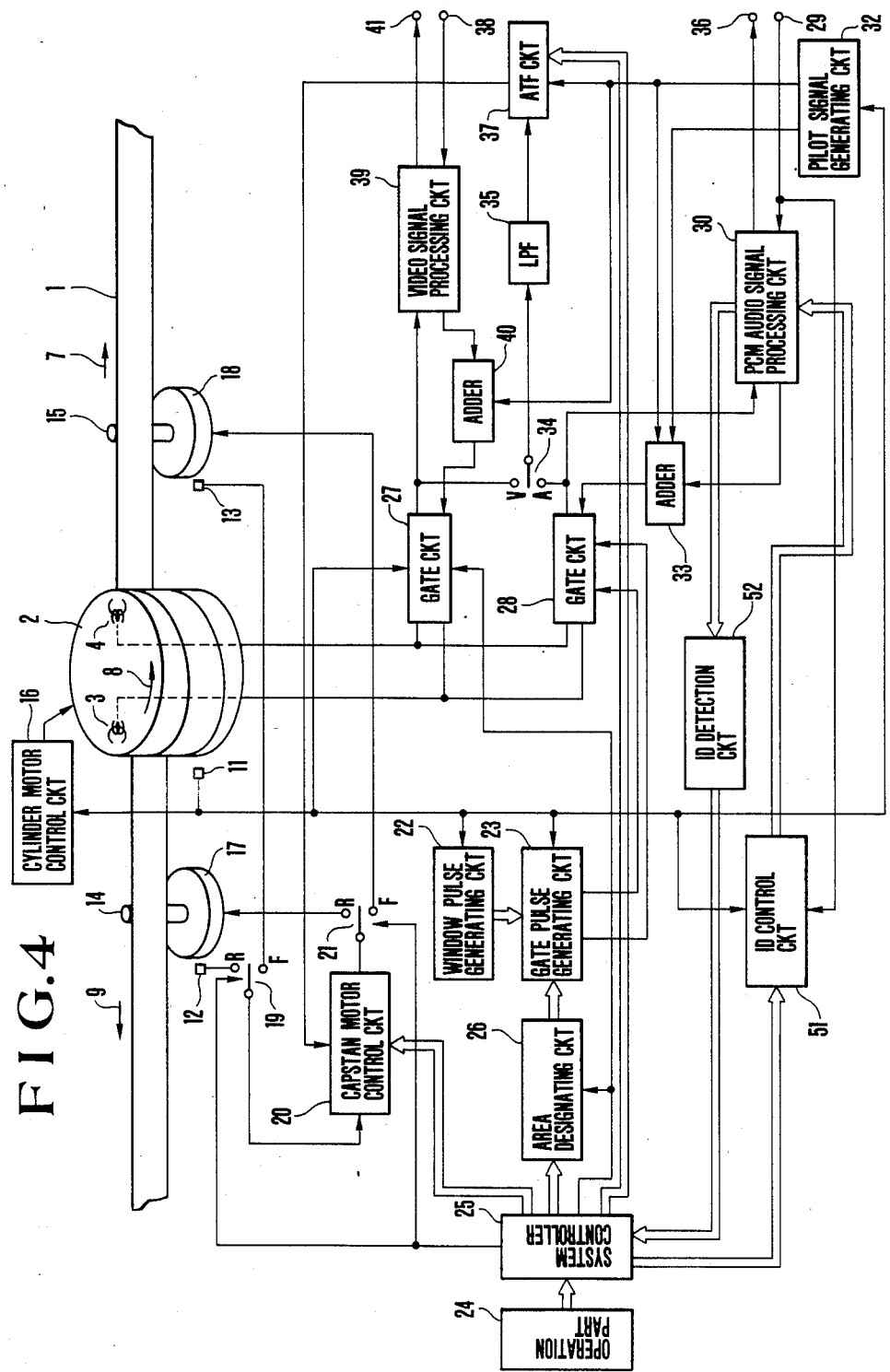
F I G. 4

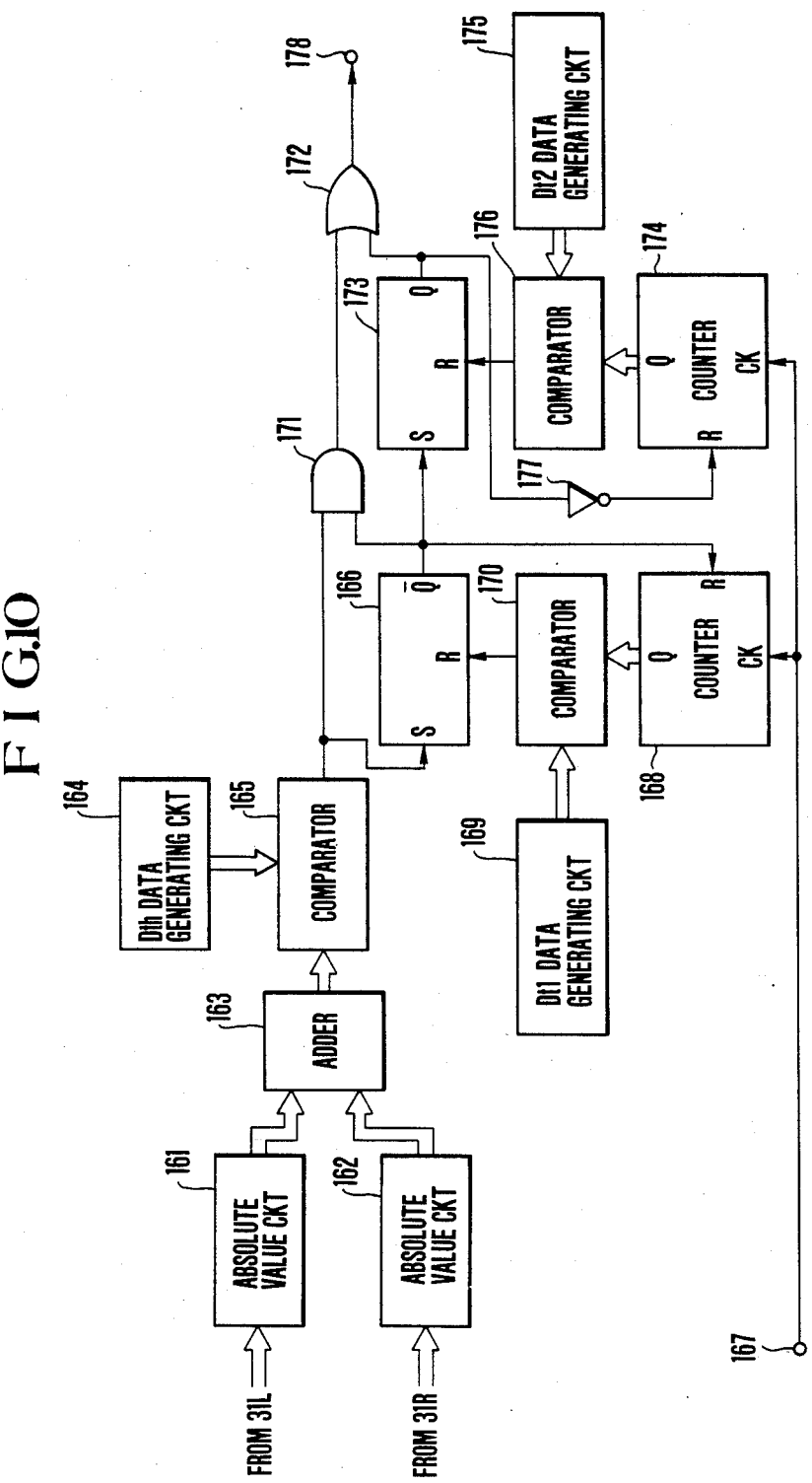

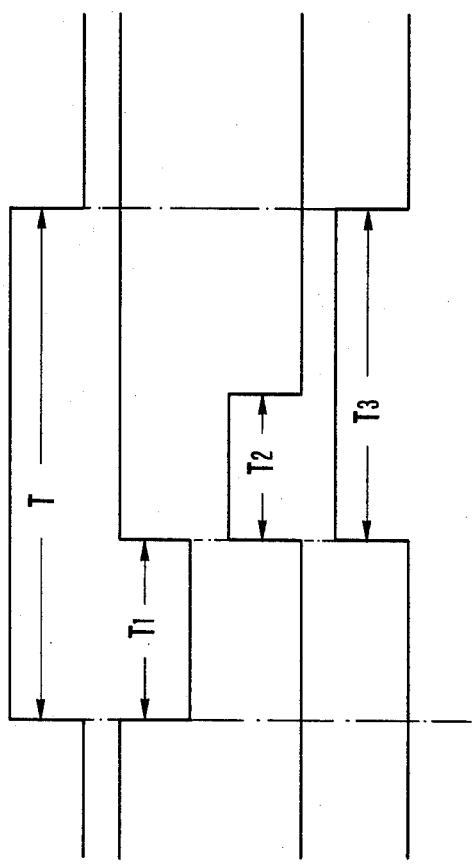
FIG.11(a) OUTPUT OF COMPARATOR 165
FIG.11(b) Q-OUTPUT OF FF 166
FIG.11(c) Q̄- OUTPUT OF FF 173
FIG.11(d) OUTPUT OF OR GATE 172

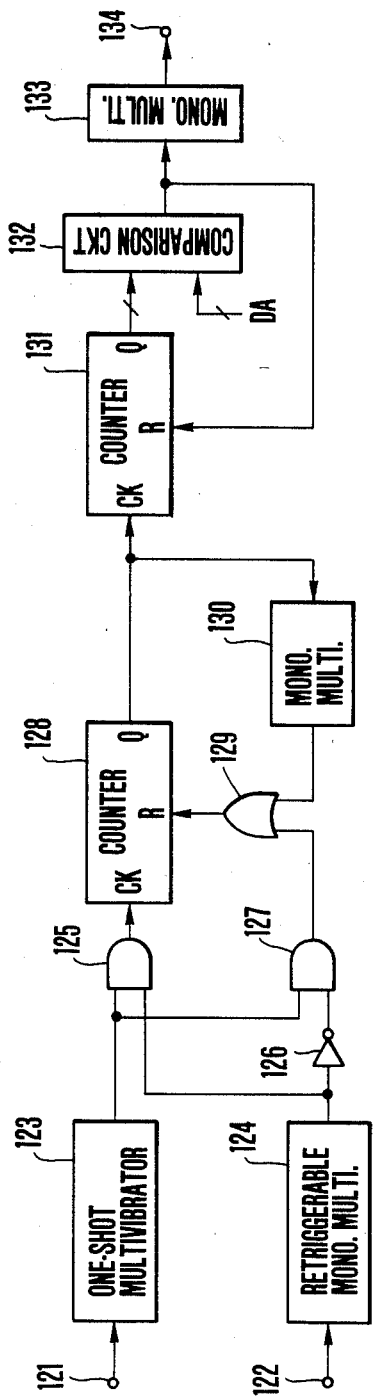

DATA RECORDING APPARATUS

This is a continuation of application Ser. No. 826,793, filed Feb. 6, 1986 now abandoned.

BACKGROUND OF THE INVENTION

1. Field of the Invention

This invention relates to a data recording apparatus and, more particularly, to an apparatus arranged to record data which relates to additional information along with data which relates to main information signals.

2. Description of the Prior Art

The data recording apparatuses of the above-stated kind include audio tape recorders which use rotary heads for recording audio signals with digital modulation by time-base compressing them. An example of the audio tape recorders of this kind is arranged as briefly described below.

FIG. 1 of the accompanying drawings shows, by way of example, the tape transport system employed in the audio tape recorder of the above-stated kind. The illustration includes a magnetic tape 1 and a rotary cylinder 2 which carries a pair of rotary heads 3 and 4. The heads 3 and 4 are arranged to obliquely trace the surface of the tape 1 in recording an audio signal on the tape. An audio signal tape recorder capable of exclusively recording audio signals in a total of six channels can be obtained by arranging it to record a time-base compressed audio signal in each of six areas formed on the tape 1 in the longitudinal direction thereof every time these heads 3 and 4 rotate 36 degrees.

The following briefly describes this tape recorder.

FIG. 1 shows the tape transport system of the above-stated tape recorder. FIG. 2 shows recording tracks formed on a tape by this tape recorder. While the head 3 or 4 traces distances from a point A to a point B, from the point B to a point C, from the point C to a point D, from the point D to a point E, from the point E to a point F and from the point F to another point G, audio signals can be recorded in areas CH1 to CH6. These areas CH1 to CH6 thus can be used for recording different audio signals therein, respectively. An operation called azimuth-overwrite is performed on these areas. However, the tracks of these areas CH1–CH6 do not have to be on the same straight line. Each of the areas CH1–CH6 has one pilot signal recorded therein for tracking control. Different pilot signals are thus recorded in different areas in the order of rotation f1→f2→f3→f4. However, there is no correlation between them.

Referring further to FIG. 1, recording or reproduction is carried out in or from these areas CH1 to CH3 while the tape 1 is travelling at a predetermined speed in the direction of arrow 7 and in or from the areas CH4 to CH6 while the tape is travelling in the direction of arrow 9. Therefore, as shown in FIG. 2, the inclination of the areas CH1 to CH3 somewhat differs from that of the areas CH4 to CH6. With regard to a difference in the relative speed of the tape and the head for these groups of areas, a difference arising from the travel of the tape 1 is extremely small as compared with a difference arising from the rotation of the heads 3 and 4. Therefore, the difference in the relative speed presents no problem.

FIGS. 3(a) to 3(j) show in a time chart, the recording or reproducing operation of the tape recorder which is arranged as described above. A phase detection pulse (hereinafter referred to as a PG signal), which is generated in synchronism with the rotation of the cylinder 2, is shown at FIG. 3(a). The PG signal is a rectangular wave of 30 Hz repeating a high level (hereinafter referred to as an H level) and a low level (hereinafter referred to as an L level) alternately with each other at intervals of 1/60 sec. Another PG signal, which is of the opposite polarity to the PG signal of FIG. 3(a), is shown in FIG. 3(b). The first PG signal is at an H level while the head 3 is rotating from the point B to the point G of FIG. 1. The other PG signal shown in FIG. 3(b) is at an H level while the other head 4 is rotating from the point B to the point G.

Pulses for reading data are obtained from the PG signal of FIG. 3(a) as shown in FIG. 3(c). The data reading pulses are used for sampling the audio signal of a period corresponding to one field (1/60 sec). FIG. 3(d) shows, by H level parts thereof, periods provided for signal processing on the one field portion of the sampled audio data by adding an error correcting redundant code or by changing the arrangement thereof by means of a RAM or the like. FIG. 3(e) shows a signal indicating data recording periods at H level parts thereof which represent timing for recording, on the tape 1, the recording data obtained through the signal processing operation mentioned above.

Referring to FIGS. 3(a) to 3(j), the temporal flow of signals are, for example, as follows: The data sampled during a period from a point of time t1 to a point of time t3, i.e. while the head 3 is moving from the point B to the point G, is subjected to a signal processing operation during a period from the point of time t3 to a point of time t5, i.e. while the head 3 is moving from the point G to the point A and are then recorded during a period from the point of time t5 to a point of time t6, or while the head 3 is moving from the point A to the point B. In other words, the data is recorded by the head 3 in the area CH1 as shown in FIG. 2. Meanwhile, the data which is sampled while the PG signal of FIG. 3(b) is at an H level is also processed at a similar timing before it is recorded in the area CH1 by the head 4.

FIG. 3(f) shows another PG signal which is obtained by shifting the phase of the PG signal of FIG. 3(a) to a predetermined degree, which corresponds to one area and is 36 degrees in this specific instance.

An audio signal recording operation using the PG signal of FIG. 3(f) and a PG signal, which is not shown but is of an opposite polarity to the former, is performed in the following manner: The data which is sampled during a period between the points of time t2 and t4 is subjected to a signal processing operation during a period between the points of time t4 and t6 in accordance with the signal of FIG. 3(g) and is recorded during a period between the points of time t6 and t7 in accordance with the signal of FIG. 3(h). In other words, the data is recorded in the area CH2 of FIG. 2 while the head is moving from the point B to the point C. Meanwhile, another data which is sampled during the points of time t4 and t7 is likewise recorded in the area CH2 by means of the other head during a period between the points of time t4 and t7.

The signal which is recorded in the area CH2 in the manner as described above is reproduced in the following manner.

The head 3 reads the data from the tape 1 in accordance with a signal shown in FIG. 3(h) during the period between the points of time t6 and t7 (and also during the period between the points of time t1 and t2). Then, during the period between the points of time t7 and t8 also (between t2 and t3), the reproduced signal is subjected to a signal processing operation which is carried out, in a manner reverse to the signal processing operation performed for recording, in accordance with a signal shown in FIG. 3(i). In other words, error correction and other processes are carried out during this period. Then, during a period between points of time t8 and t9, the reproduced audio signal which has been thus processed is produced in accordance with a signal shown in FIG. 3(j). The reproducing operation of the head 4 is of course performed with a phase difference of 180 degrees from the above-stated reproduction by the head 3, so that a continuous reproduced audio signal can be obtained.

For other areas CH3 to CH6, it goes without saying that the recording and reproducing operations are performed on the basis of the PG signal of FIG. 3(a) by phase shifting it as much as n×36 degrees. This is independent of the travelling direction of the tape.

It has thus become possible to obtain an audio-dedicated apparatus capable of recording audio signals over a long period of time in many channels. Assuming that recording lasts 90 min. for each of the areas, the audio tape recorder of this type is capable of recording a total of nine hours. Meanwhile, however, it is difficult to quickly find out what is recorded where. In other words, in searching a desired part of the record with the record bearing medium or tape allowed to travel at a high speed, the head is incapable of accurately tracing the recording tracks formed on the tape. Then, a reproduced audio signal cannot be obtained from the PCM audio signal. A lowered reproduction level of the audio signal makes it hardly possible to detect a part having no audio information, i.e. a mute part. With respect to the mute part, the record includes a PCM audio signal corresponding to information on the mute part. Therefore, it is also impossible to detect the mute part by detecting the presence or absence of a recorded signal.

It is, therefore, preferable to facilitate a look-up operation by having some mark data recorded on the recording medium.

Further, in the field of recording digitized audio signals on a recording medium, technique for data recording in high density has advanced during recent years. The advanced technique in this field has come to allow a considerably greater degree of latitude to the recording format on the recording medium in recording an audio signal without changing the data format employed before. As a result, devices having similar recording formats have become compatible under such a condition. Taking interchangeability among these devices into consideration, it is preferable to have some data recorded on the recording medium indicating the recording format employed in some suitable manner. The audio signal is to be recorded in the form of digital data. Therefore, the above-stated data which is to be used for look-up and the data which is indicative of the recording format are preferably recorded along with the audio signal also in the form of digital data having the same number of bits, because such arrangement permits recording in increased density without hindrance.

Meanwhile, in recording and reproducing data in general, occurrence of a drop-out or the like brings about an error in data. Such a data error is detected, during a reproducing operation, by means of a known error detecting circuit. Upon detection of the error, the reproduced data is replaced with some other data as it is invalid. In cases where there is the probability of occurrence of the error, the arrangement called data interpolation is applicable to the audio signal. However, the data interpolation becomes impossible in the event of a high degree of error occurring probability. Generally, therefore, error data is unconditionally replaced with predetermined data when a data error arises after transmission on the assumption that data interpolation is impossible.

The predetermined data to be used for such replacement is generally determined on the condition that it brings about no adverse effect when reproduced and that it can be readily generated. Accordingly, although it depends on the binary arrangement to be employed, the majority of such systems are using data consisting of bits which are all "0" as the predetermined data. Such being the generally employed practice, the above-stated look-up data and the recording format data are replaced with such data in the event of occurrence of errors in them. However, the recording format data must includes information of varied kinds in a predetermined number of bits. Therefore, the predetermined number of bits which are all "0" indicates valid information. Accordingly, in the event that the reproduced recording format data which has the bits being all "0", it is hardly possible to make a discrimination as to whether the data is valid or invalid.

SUMMARY OF THE INVENTION

It is an object of this invention to provide a data recording apparatus which eliminates the above-stated shortcomings of the prior art apparatuses.

It is another object of this invention to provide a data recording apparatus which is capable of making a discrimination between the validity and invalidity of a predetermined number of bits of reproduced additional information data which is recorded along with the data of information signals.

Under this object, a data recording apparatus arranged according to this invention as an embodiment thereof comprises:

(a) data recording means including a rotary head arranged to obliquely trace a tape-shaped recording medium, said recording means being arranged to record data while forming many parallel recording tracks in one of an "l" number of areas extending in the longitudinal direction of said recording medium;

(b) means for forming, by sampling a main information signal, first binary data of an "n" number of bits ("n" being an integer);

(c) means for forming second binary data of the "n" number of bits including binary data of an "m" number of bits ($2^m > 1$) which indicates one of said "l" number of areas, said "m" number of bits of binary data never simultaneously becoming "0"; and (d) means for forming a data sequence including said first and second binary data and for supplying said data sequence to said recording means.

These and further objects and features of this invention will become apparent from the following detailed description of preferred embodiments thereof taken in connection with the accompanying drawings.

BRIEF DESCRIPTION OF THE DRAWINGS

FIG. 4 is diagram showing in outline a tape recorder embodying this invention as an embodiment thereof.

FIG. 10 is a diagram showing, by way of example, the details of a leader search look-up data forming part of an ID control circuit shown in FIG. 9.

FIGS. 11(a) to 11(d) show in a timing chart the operation of the circuit shown in FIG. 10.

FIG. 12 is a diagram showing, by way of example, the details of a leader search control part included in an ID detecting circuit of FIG. 9.

DETAILED DESCRIPTION OF THE PREFERRED EMBODIMENTS

Figure 1:
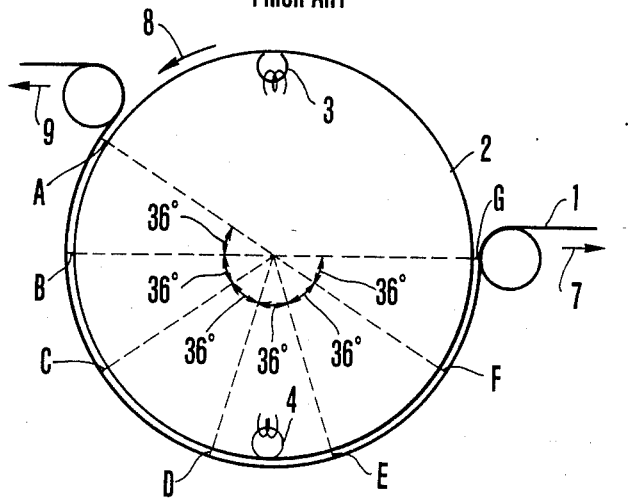
FIG. 1 is an illustration of the tape transport system of the conventional tape recorder.
Figure 2:
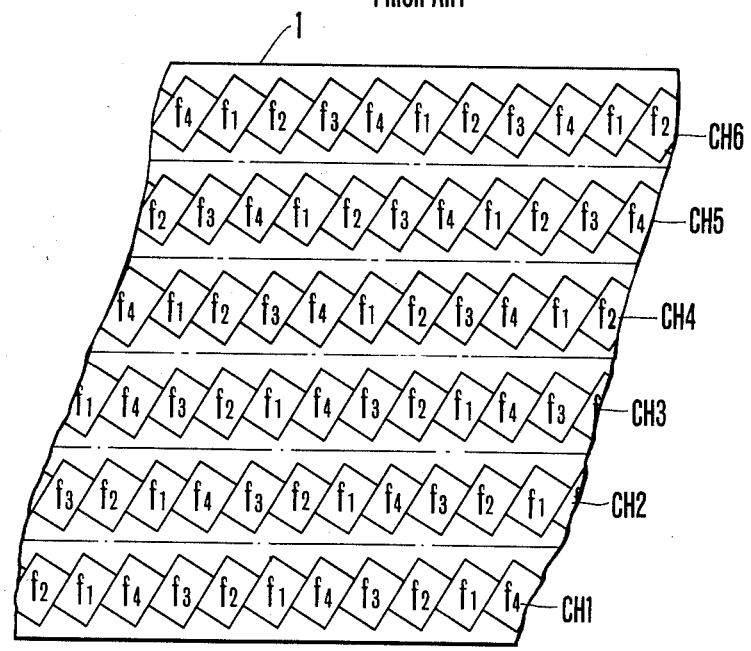
FIG. 2 is an illustration of recording format of the tape recorder of FIG. 1.
Figure 3:
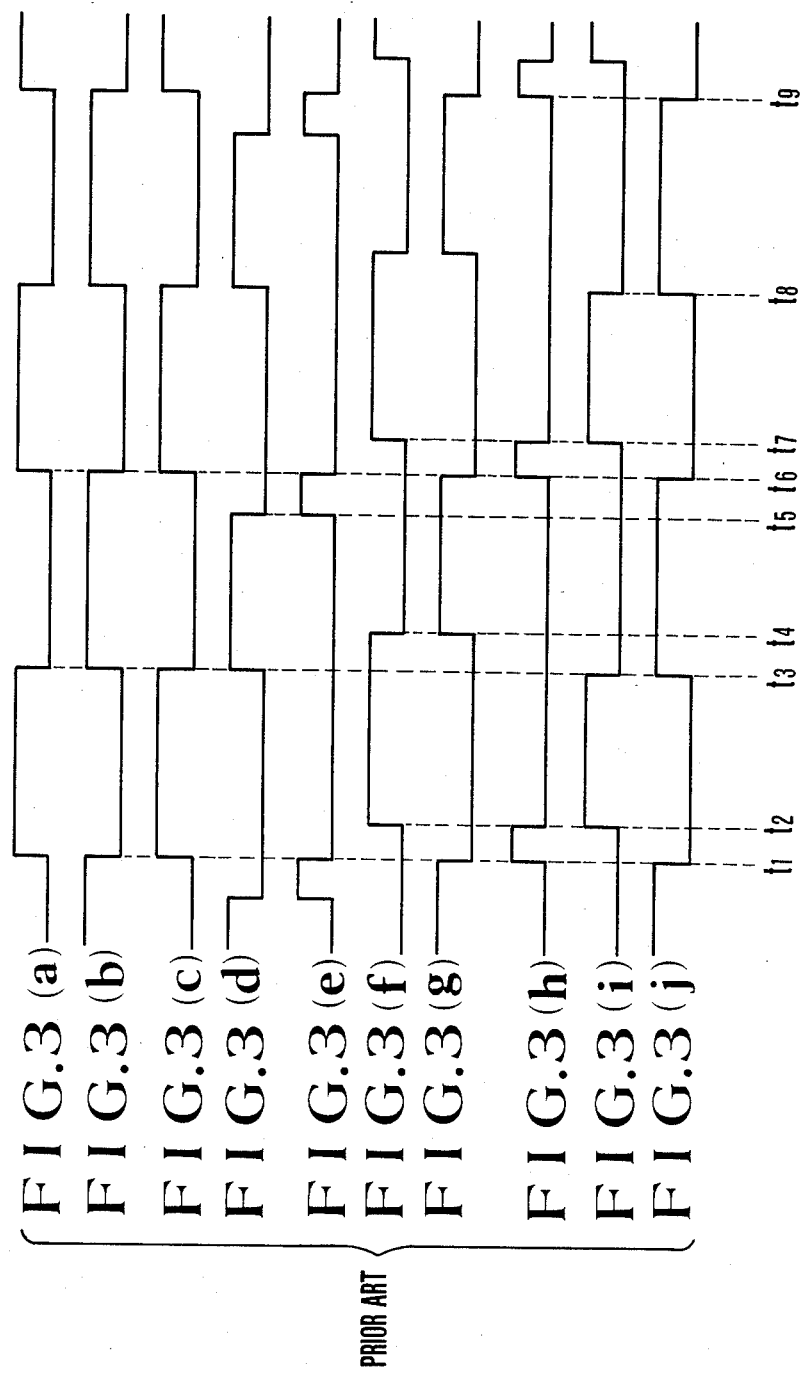
FIGS. 3(a) to 3(f) show, in a timing chart, the recording and reproducing operations of the conventional tape recorder shown in FIG. 1.

The details of this invention will be understood from the following description of preferred embodiments thereof: FIG. 4 shows in outline the arrangement of a tape recorder made according to this invention as an embodiment thereof. In FIG. 4, the component elements which are similar to corresponding ones shown in FIG. 1 and FIG. 2 are indicated by the same reference numerals respectively. A PG signal, which is obtained from the rotation detector 11 representing the rotation of the rotary cylinder 2, is supplied to a cylinder motor control circuit 16. The circuit 16 then causes the cylinder 2 to be rotated at a predetermined speed and at a predetermined rotation phase. Rotation detectors 12 and 13 are arranged to detect the rotation of the flywheels 17 and 18 of capstans 14 and 15. The outputs (hereinafter referred to FG signals) of these rotation detectors 12 and 13 are supplied to a switch 19. The switch 19 selectively supplies one of them to a capstan motor control circuit 20. In recording, the output of the circuit 20 is supplied to one of capstan motors via a switch 21 in such a manner as to cause the capstan 14 or 15 to rotate at a predetermined speed. These switches 19 and 21 are in connection with their terminals F, respectively, for allowing the tape 1 to travel in the direction of arrow 7 (in the forward direction). They are in connection with other terminals R in allowing the tape 1 to travel in the direction of arrow 9 (in the reverse direction), respectively. The above-stated PG signal is supplied also to a window pulse generating circuit 22 and a gate pulse generating circuit 23.

An operation part 24 is arranged to permit selection of a recording, reproduction or other operation mode and designation of a recording or reproducing area on the tape by a manual operation thereon. The operation part 24 also permits designation of a track pitch and the direction in which the tape 1 travels at the time of recording.

The data which are thus obtained are supplied to a system controller 25. The system controller 25 controls the capstan motor control circuit 20, the switches 19 and 21, an area designating circuit 26, a gate circuit 27, etc. The area designating circuit 26 is arranged to supply an area designating data to the gate pulse generating circuit 23. The circuit 23 then produces a desired gate pulse. With regard to the gate pulse controlling a gate circuit 28, the gate pulse generating circuit 23 selectively supplies, according to the area designating data, the gate circuit 28 with one of the window pulses generated by the window pulse generating circuit 22 for each of the heads 3 and 4.

In recording, an analog audio signal coming via a terminal 29 is supplied to a PCM audio signal processing circuit 30. The audio signal is then sampled at the timing relative to the window pulse mentioned in the foregoing. A digital data is thus obtained and is further subjected to a signal processing operation which is performed in a manner as mentioned in the foregoing. Furthermore, the PCM audio signal processing circuit 30 generates additional information (ID) described later, as well as the audio data. The recording audio data which is thus obtained is supplied to an adder 33. The adder 33 adds tracking pilot signals (TPS) of frequency values f1, f2, f3 and f4, generated in rotation by a pilot signal generating circuit 32 in the sequence of f1→f2→f3→f4 and other pilot signals, which will be described later, to the audio data. The output of the adder 33 is suitably gated by the gate circuit 28, as mentioned in the foregoing, to be written into a desired area by means of the heads 3 and 4.

In reproducing, signals reproduced by the heads 3 and 4 are extracted by the gate circuit 28 also according to the window pulses. The reproduced signal which is thus obtained is supplied via a terminal A of a switch 34 to a low-pass filter (LPF) 35 and is also supplied to a PCM audio signal processing circuit 30. The PCM audio signal processing circuit 30 performs a signal processing operation on the signal, including error correction, time-base expansion, digital-to-analog conversion, etc., in a manner converse to the operation performed in recording. The reproduced analog audio signal which is thus processed is then produced from a terminal 36.

The LPF 35 separates the above-stated tracking pilot signals and supplies them to an ATF circuit 37. The ATF circuit 37 is arranged to produce a tracking error signal operating in accordance with the known four frequency method, wherein the reproduced tracking pilot signals are used in combination with other pilot signals which are generated by the pilot signal generating circuit 32 in the same sequence of rotation as in the case of recording. Here, the tracking error signal is obtained for every area to be sampled and held. The tracking error signal thus obtained is supplied to the capstan motor control circuit 20. The circuit 20 controls the reproduction travelling speed of the tape 1 through the capstans 14 and 15.

Recording and reproducing operations on a video signal are as described below.

When the system controller 25 issues a video signal recording instruction, the area designating circuit 26 is forced to designate the area CH1. Then, a gate circuit 27 is caused to operate according to the PG signal. A video signal coming through a terminal 38 is processed into a signal form suited for recording through a video signal processing circuit 39. The processed video signal is supplied to an adder 40. The adder 40 adds the pilot signals obtained from the pilot signal generating circuit 32 to the video signal. The output of the adder 40 is supplied via a gate circuit 27 to the heads 3 and 4 to be recorded in the applicable parts of the areas CH2 to CH6. In this instance, the PCM audio signal is recorded in exactly the same manner as in the case of the recording operation described in the foregoing.

At the time of reproduction, video signals picked up by the heads 3 and 4 are made into one continuous signal through the gate circuit 27. The continuous signal is supplied to the video signal processing circuit 39 to be brought back into the original signal form. The output of the processing circuit 39 is produced from a terminal 41. Further, the continuous signal produced from the gate circuit 27 is also supplied to the LPF 35 via a terminal V of the switch 34.

The LPF 35 continuously separates pilot signal components, which are then supplied to the ATF circuit 37. In this instance, a tracking error signal obtained from the ATF circuit 37 does not have to be sampled and held. The tracking error signal is thus supplied to the capstan motor control circuit 20 as it is. Further, in this instance, a PCM audio signal is also reproduced from the area CH1 to give a reproduced analog audio signal from a terminal 36. However, tracking control using the output of the gate circuit 28 is not performed.

Figure 5:
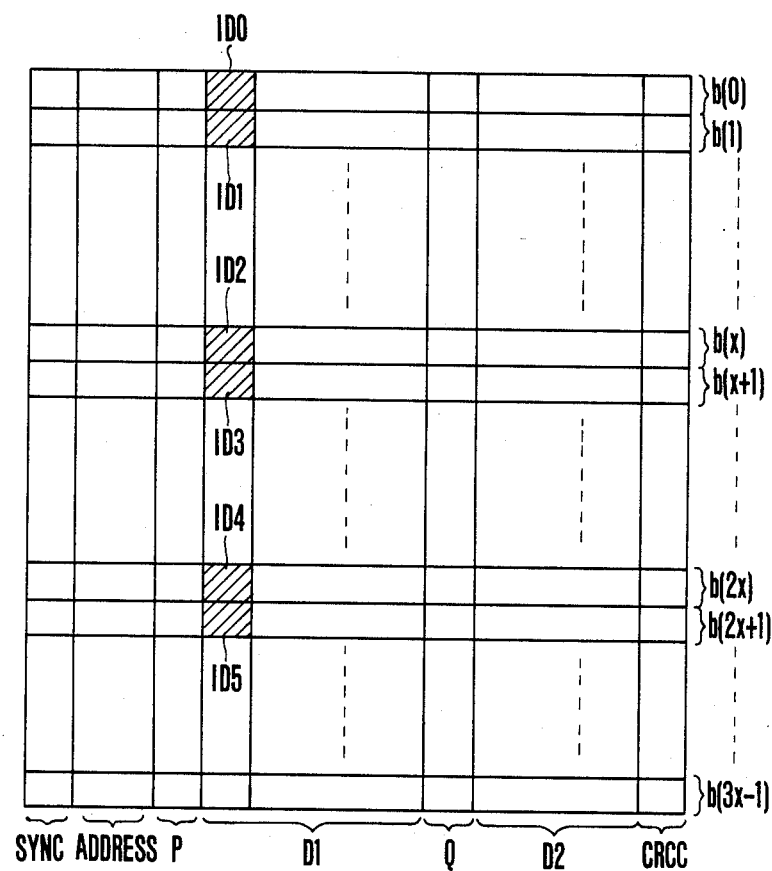
FIG. 5 is an illustration of a data matrix showing the recording format employed by the same embodiment.

Next, an example of the data format applicable to this embodiment is as follows: FIG. 5 shows a format in which data is recorded within one track in each of the areas shown in FIG. 2. In other words, the data format includes PCM audio data corresponding to the audio signal of two channels of 1/60 sec.

In the data matrix shown in FIG. 5, a column SYNC consists of synchronizing data. A column ADDRESS consists of address data. Columns P and Q consist of error correcting redundant data. A column CRCC consists of known check code data. Each of columns D1 and D2 includes a plurality of columns respectively consisting of data relative to the two-channel audio signal. The data matrix comprises lines b(0) to b(3x−1). Each of these lines is arranged to form a data block, which is recorded from the left-hand side to the right-hand side. The data of the column SYNC in the line b(0) is followed by the data of the column ADDRESS in the line b(0) and is further followed by the data of the column P in the line b(0) and so on. After the data of the last column in the line b(x) is recorded, the data of the column SYNC in the next line b(x+1). The data recording in one track comes to an end when the data of the last column in the line b(3x−1) is recorded.

Within the column D1, six data of the lines b(0), b(1), b(x), b(x+1), b(2x) and b(2x+1), which are expressed as ID0 to ID5, represent information other than the information contained in the audio signal.

The details of these data ID0 to ID5 are as described below with reference to Tables 1 and 2:

TABLE 1

| Mode | ID0 | ID1 | ID2 | ID3 | ID4 | ID5 | Remarks |
|---|---|---|---|---|---|---|---|
| 1 | 1 | hour | min | sec | file No. | Y | counter |
| 2 | 2 | pro. No. | cut No. | min | sec | Y | cut data |
| 3 | 3 | year | month | day | day of week | Y | time |
| 4 | 4 | o'clock | min | sec | file No. | Y | time |
| 5 | 5 | pro. No. | hour | min | sec | Y | program data |
| 6 | 6 | pro. No. | hour | min | sec | Y | tape data |

TABLE 1-continued

| Mode | ID0 | ID1 | ID2 | ID3 | ID4 | ID5 | Remarks |
|---|---|---|---|---|---|---|---|
| 7 | 7 | No. X | hour | min | sec | Y | tape data |
| 8 | 8 | X | hour | min | sec | Y | program data |

TABLE 2

| bit No. | Data ID5 (Y) in each mode | Data ID1 (X) in modes 7 and 8 |
|---|---|---|
| 1 | validity | tape travel direction |
| 2 | audio signal form | next track No. |
| 3 | audio signal form | next track No. |
| 4 | L channel audio and others | next track No. |
| 5 | R channel audio and others | track pitch |
| 6 | beginning part of the record | track pitch |
| 7 | end part of the record | data for look-up |
| 8 | dubbing prevention | data for look-up |

The 8-bit data ID0 is a mode designating data indicating the kind of information to be represented by the data ID1 to ID5. In modes 1 to 6, the data ID1 to ID4 indicate information as shown in Table 1. More specifically, in the mode 1, the data ID1 to ID4 indicate time information from a tape counter. In the mode 2, they indicate time information for each cut. In modes 3 and 4, they indicate hour information. The data ID1 to ID4 in the mode 5 and the data ID2 to ID4 in the mode 8 indicate time information for each program. The data ID1 to ID4 in the mode 6 and the data ID2 to ID4 in the mode 7 respectively show information on the lengths of time from the head part of the tape. In Table 1, a reference symbol pro. No. denotes a program number; cut No. denotes a cut number; and file No. denotes a file number. In the case of a system arranged to use data of all "0" as a substitute when a data error takes place, it is preferable to arrange the all "0" data to be not readily producible. Therefore, compared with ordinary data, the relation between "0" and "1" are conversely arranged to indicate "0" as all "1" (11111111) and "1" as 11111110. The details of information indicated by the 8-bit data "X" and "Y" in Table 1 are as shown in Table 2. Referring to Table 2, the symbol Y denotes the information of the data ID5 in each of the modes 1 to 8. The first bit of the data Y indicates whether the 8-bit data Y is valid or not. The second and third bits indicate the form of the audio signal as to whether the audio information recorded in two channels is monaural or stereophonic. The fourth and fifth bits of the data Y indicate whether audio signal information is to be recorded in the parts corresponding to the first and second channels or some other information is to be recorded there. The sixth and seventh bits of the data Y respectively become "1" at the parts where the audio signal recording begins and comes to an end. The eight bit of the data Y becomes "1" in cases where dubbing is to be prevented.

The other 8-bit data X is obtained when the data ID1 is in the modes 7 and 8. The data X is indicative of the recording format. As shown in Table 2, the following information is included in the data X: The first bit of the data X indicates the tape travel direction taken in recording. It becomes "0" when the tape is allowed to travel for recording in the direction of arrow 7 as shown in FIG. 4, and becomes "1" when the tape is allowed to travel in the direction of arrow 9.

Each of the second, third and fourth bits of the data X indicates, in conjunction with other two bits, the number of a track in which recording is to be performed a next time and which designate one of the areas CH1 to CH6. Since the next track number indicating data consists of three bits, it can be used for information of eight different kinds. Since the tracks to be designated do not exceed six kinds, "100", "010", "110", "001", "101" and "011" can be used in designating the areas CH1, CH2, CH3, CH4, CH5 and CH6. Then, in the event of detection of an error, where the second, third and fourth bits of the above-stated substitute data become all "0" or all "1", the arrangement of the three bits of the above-stated next track number indicating data can be distinguished from them. In the case of a system where the bits of the substitute data all become "0", a data "111" can be used for information of another kind, such as information indicative of "the recording area remains unchanged," for example.

The fifth and sixth bits of the 8-bit data X indicate a track pitch. With these bits, a maximum of four different track pitch values are prescribable. For example, "00" may be prescribed for a standard track pitch; "10" for a track pitch obtained at a ½ tape speed for long time recording; and "01" and "11" for a third and fourth track pitches. In this instance, with the standard track pitch arranged to be indicated by "01", the long time recording track pitch by "10" and the third track pitch by "00" or "11", the data "00" or "11" will not be recorded. If the second, third and fourth bits are arranged to be not recorded as "000" and the fifth and sixth bits prescribed not to become "11", the arrangement becomes applicable to a system arranged to generate substitute data in which the second to sixth bits all become "0" or "1".

The seventh and eighth bits of the 8-bit data X form look-up data to be used for the operation called a leader search. For example, data indicated as "11" is recorded at least over a predetermined period of time (such as one sec. +60 tracks) when the audio data coming via the terminal 29 of FIG. 4 remains mute for a predetermined period of time, say, two seconds. Further, during the process of a musical composition, if it is desired to mark a part thereof and to detect the part later on, the system controller 25 is manually operated to produce an instruction to have "01" recorded over a predetermined period (one sec., for example) accordingly. Meanwhile, "10" is recorded in other parts having the audio signals normally recorded. In cases where this look-up system is not employed, "00" is recorded.

Figure 6:
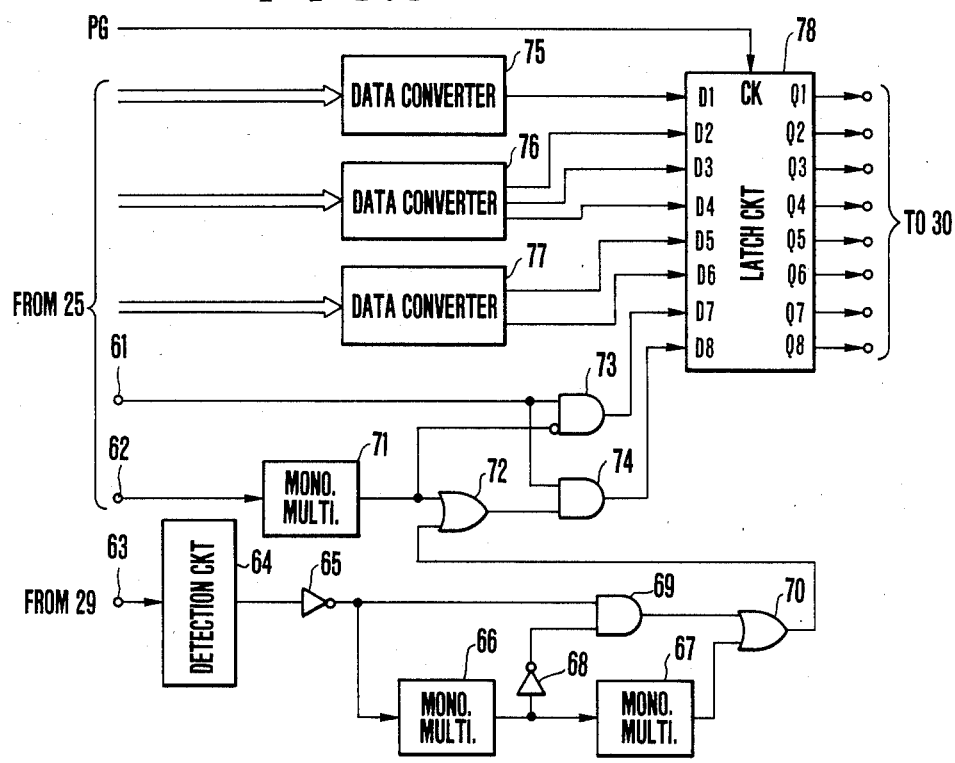
FIG. 6 is a circuit diagram showing, by way of example, the details of an ID control circuit shown in FIG. 4.

FIG. 6 is a circuit diagram showing, by way of example, the details of an ID control circuit 51 which is included in the embodiment shown in FIG. 4. Referring to FIG. 6, a terminal 61 is arranged to receive from the system controller 25 a signal which is at a low level when the seventh and eighth bits of the data X are not used and is at a high level when they are used. A terminal 62 is arranged to receive from the system controller 25 a narrow pulse signal conveying a mark recording instruction issued in response to the above-stated manual operation. Another terminal 63 is arranged to receive an incoming analog audio signal.

Figure 7A:
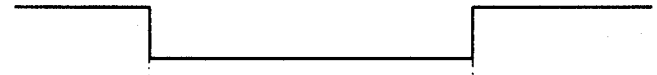
FIGS. 7(a) to 7(e) show in a timing chart the operation timing of the various parts shown in FIG. 6.
Figure 7B:
Figure 7C:
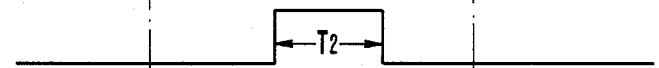
Figure 7D:
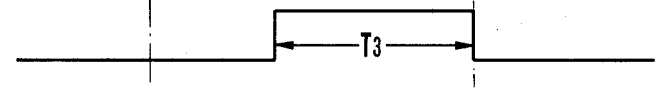
Figure 7E:

The incoming analog audio signal is supplied to a detection circuit 64 which has a predetermined threshold level. During a period corresponding to a mute part, the output level of the detection circuit 64 changes to a low level as shown in FIG. 7(a). The output of the detection circuit 64 is inverted by an inverter 65 as shown in FIG. 7(b) and is then supplied to a monostable multivibrator (hereinafter referred to as mono-multi for short) 66 and an AND gate 69. The mono-multi 66 is triggered by the rise of the input to produce a high level output over a predetermined period of time T1, say, two sec. as shown in FIG. 7(c). When the output level of the mono-multi 66 drops, a mono-multi 67 is triggered to produce a high level output for a predetermined period of time T2, say, one sec. as shown in FIG. 7(d). Then, the output level of the AND gate 69 becomes as shown in FIG. 7(e) and a logical sum is obtained from the output of the mono-multi 67 in the form of a signal as shown in FIG. 7(e). This signal is supplied to an OR gate 72 as a mute state detection signal.

A mono-multi 71 is triggered by a narrow pulse signal supplied to the terminal 62. The mono-multi 71 then supplies the OR gate 72 and the inversion input terminal of an AND gate 73 with a high level signal which remains at a high level for a predetermined period (one sec.). As a result, the AND gate 73 produces "1" under a look-up function operating condition with the exception of the marking period resulting from the manual operation. Another AND gate 74 produces "1" in the event of a mute part or during the marking period under the look-up function operating condition. These outputs "1" correspond to the data of the above-stated seventh and eighth bits and is supplied to terminals D7 and D8 of a latch circuit 78.

Meanwhile, the data indicative of the tape travel direction, the data designating a next recording track and the data indicative of the recording track pitch are supplied from the system controller, respectively, to data converters 75, 76 and 77. These data are then converted into data corresponding to the first to sixth bits mentioned in the foregoing. These data are then produced from the data converters 75, 76 and 77 to terminals D1 to D6 of the latch circuit 78 respectively. The latch circuit 78 in the meantime has the above-stated PG signal supplied thereto as clock pulses. Thus, the PG signal and eight-bit data produced from the output terminals Q1 to Q8 of the latch circuit 78 are synchronized with each other. The eight-bit parallel data thus obtained is supplied to the PCM audio signal processing circuit 30.

Figure 8:
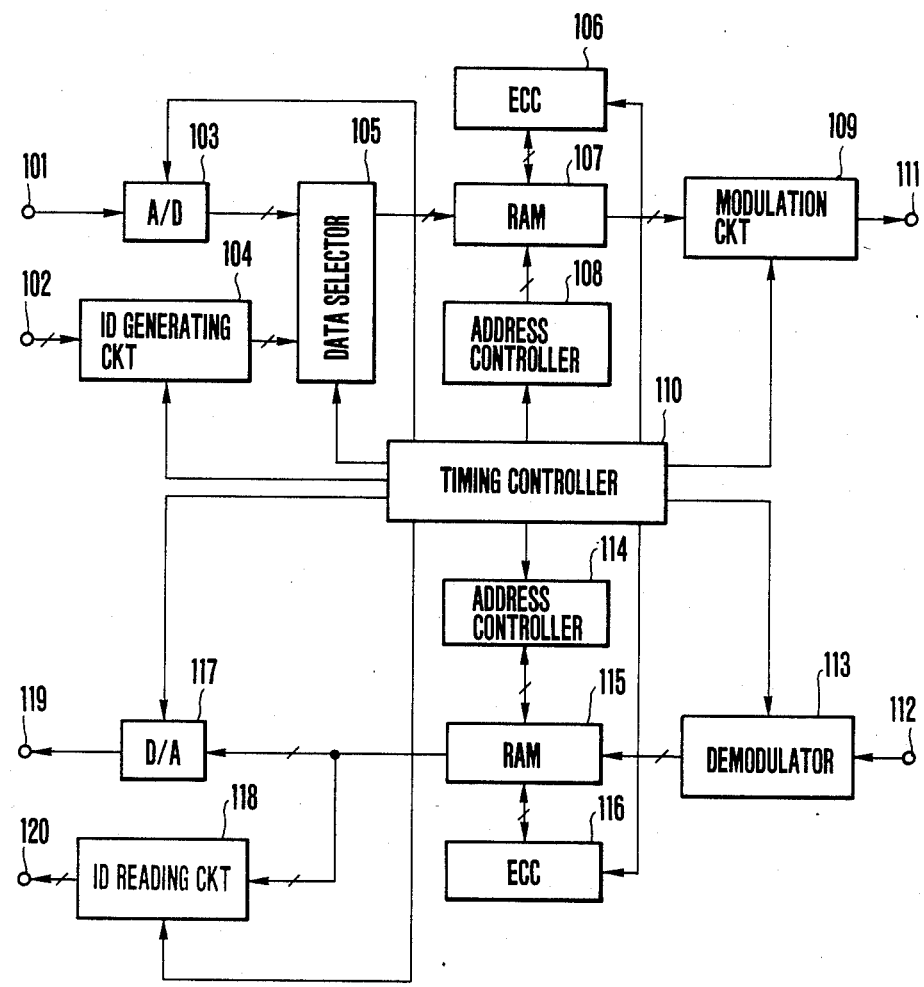
FIG. 8 is a diagram showing, by way of example, the details of a PCM audio signal processing circuit shown in FIG. 4.

FIG. 8 shows, by way of example, the details of arrangement of the PCM audio signal processing circuit 30 shown in FIG. 4. The circuit 30 includes a terminal 101 which is arranged to receive the incoming analog audio signal supplied to the terminal 29. A terminal 102 is arranged to receive the data produced from the ID control circuit 51 as shown in FIG. 7. The parallel data received at the terminal 102 is supplied to an ID generating circuit 104. The circuit 104 then produces data which is seriated at a predetermined timing.

Meanwhile, the analog audio signal received at the terminal 101 is supplied to an analog-to-digital (A/D) converter 103. The A/D converter 103 samples the analog audio signal at a predetermined frequency and, after that, quantizes it. Serial data of a predetermined timing which is thus obtained is supplied to a data selector 105. The data selector 105 supplies a RAM (random access memory) 107 with the output of the ID generating circuit 104 once in every one-field period at a timing corresponding to the data ID1. At a different timing, the data selector 105 supplies the output of the A/D converter 103 to the RAM 107. At the RAM 107, the parity word (P, Q) obtained from an error correction circuit (ECC) 106, address data obtained from an address controller 108 such as CRCC are arranged together with the data obtained from the above-stated data selector 105 in accordance with the data matrix arrangement shown in FIG. 5. Time-base compressed data which is arranged in the above-stated order is supplied from the RAM 107 to a modulation circuit 109. The modulation circuit 109 performs a digital modulation operation such as BPM (by-phase modulation), etc. The output of the circuit 109 is produced from a terminal 111. The digital modulated audio signal thus produced from the terminal 111 is supplied to the above-stated adder 33.

In reproduction, the embodiment operates as follows: The digital modulated signal coming from the gate circuit 28 is supplied to a terminal 112 to be demodulated by a digital demodulator 113. The demodulated signal is supplied to a RAM 115. The RAM 115 performs a signal processing operation in exactly a reverse manner to the RAM 107. In other words, the data arrangement is changed on the basis of the address data obtained from an address controller 114 and also synchronizing data. Any error is corrected at an ECC 116. As a result, the data of the columns D1 and D2 are produced from the RAM 115 and is supplied to a D/A (digital-to-analog) converter 117 and an ID reading circuit 118. The D/A converter 117 converts the input into the original analog audio signal and produces it via a terminal 119 from the terminal 36 of FIG. 4. Meanwhile, the ID reading circuit 118 picks up the above-stated ID data and supplies it to the ID detection circuit 52. The operations of all the parts of the signal processing circuit 30 shown in FIG. 8 are synchronized by a timing signal generated by a timing controller 110.

The ID detection circuit 52 looks up the ID data and supplies the system controller 25 with information which is as shown in Tables 1 and 2. Then, in accordance with the input data, the system controller 25 controls the area designation circuit 26 and the capstan motor control circuit 20.

With the tape recorder arranged according to this invention as described above, in the event of occurrence of any code error in the data recorded in the recording format along with the information data, the meaninglessness of the substitute data can be promptly detected. In that event, the system controller 25 is capable of invalidating that data. This precludes the possibility of any erroneous operation. Besides, this advantageous effect is attainable without decreasing the amount of information to any tangible extent. This is a great advantage in arranging a system.

Figure 9:
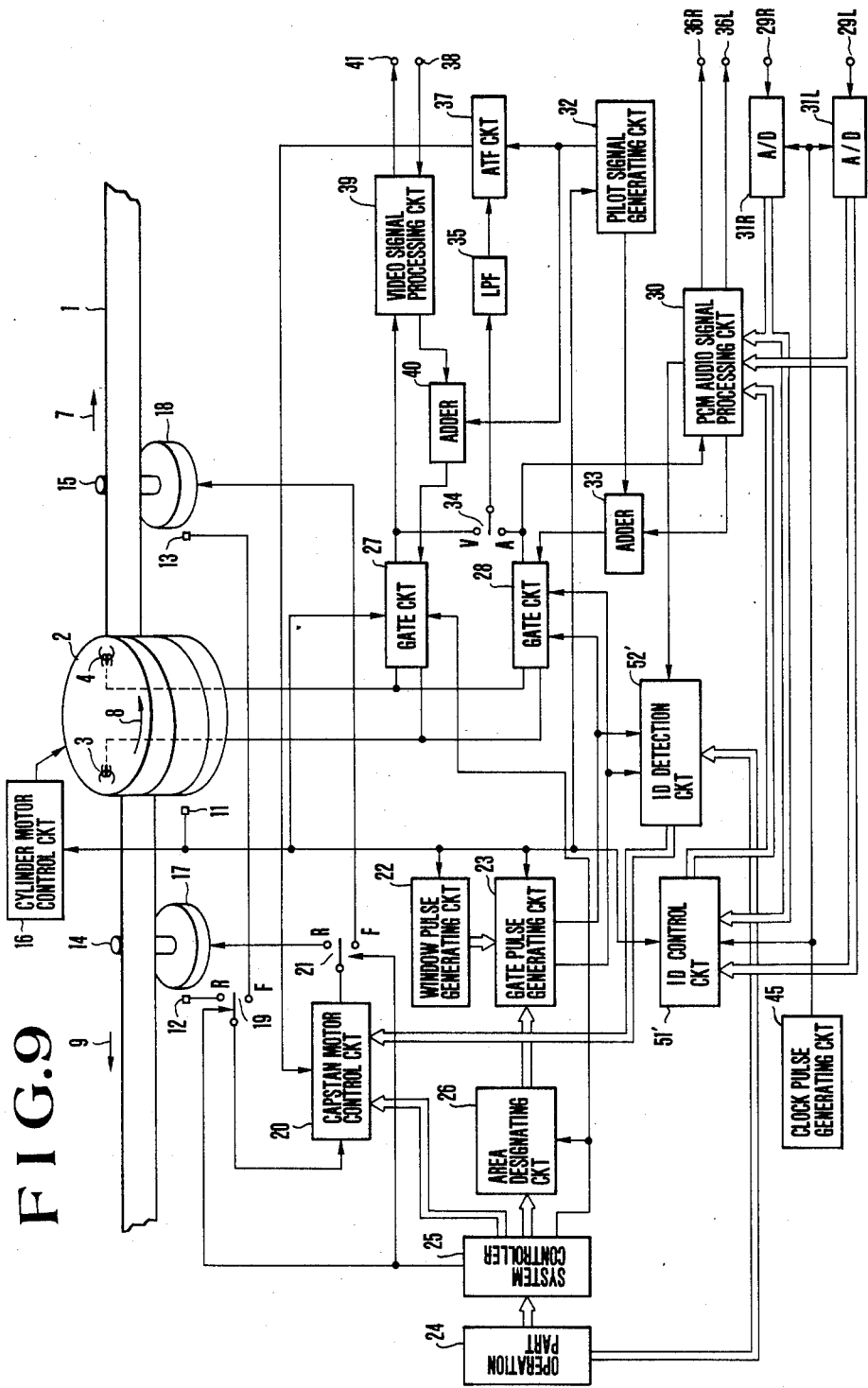
FIG. 9 is a diagram showing in outline a tape recorder arranged according to this invention as another embodiment.

FIG. 9 shows in outline the arrangement of a tape recorder according to this invention as another embodiment thereof. The same component elements as those shown in FIG. 4 are indicated by the same reference numerals and are omitted from description given here. In this embodiment, some improvement is made in the arrangement of the look-up data forming part for the leader search operation of the preceding embodiment shown in FIG. 4. With the exception of this point, the tape recorder of FIG. 9 is similar to the tape recorder of FIG. 4.

Referring to FIG. 9, during recording, an analog stereo audio signal coming from terminals 29R and 29L is supplied to a PCM audio signal processing circuit 30 via A/D converters 31R and 31L. More specifically, the signal is sampled according to the clock pulses generated by a clock pulse generating circuit 45 at the above-stated timing relative to the window pulse. The sampled signal is changed into digital data and is then subjected to the above-stated signal processing operation.

During reproduction, a signal processing operation is carried out in the same manner as in the case of FIG. 4. After that, a reproduced analog stereo audio signal is produced from terminals 36R and 36L.

This embodiment performs a leader search function in the following manner: FIG. 10 shows, by way of example, the details of arrangement of the look-up data generating part of the ID control circuit 51 of FIG. 9. FIGS. 11(a) to 11(d) show, in a timing chart, the wave forms of the outputs of various parts of FIG. 10.

Referring to FIG. 10, an absolute value circuit 161 is arranged to receive from an A/D converter 31L recording audio signal data of the channel L. Another absolute value circuit 162 is arranged to receive from an A/D converter 31R recording audio signal data of the channel R. These circuits 161 and 162 respectively produce the absolute value portions of the audio signal data. An adder 163 is arranged to add the data produced from the absolute value circuits 161 and 162 together. When the incoming analog stereo audio signal discontinues, there obtains a mute state. Then, the value of the data produced from the adder 163 becomes smaller. A comparator 165 is arranged to compare the data produced from the adder 163 with data Dth produced from a data generating circuit 164. The comparator 165 produces a high level output when the data produced from the adder 163 is less than a value Dth and produces a low level output when it is more than the value Dth. In other words, there obtains the mute state when the output level of the comparator 165 is continuously at a high level.

An RS flip-flop 166 is triggered by the output of the comparator 165 and is reset after the lapse of a predetermined period of time T1. A terminal 167 is arranged to receive the clock pulses used for driving the above-stated A/D converters 31R and 31L. The clock pulses are counted by a counter 168. The counted data thus obtained is compared with data Dt1 produced from a data generating circuit 169 which is arranged to generate data corresponding to the above-stated period of time T1. When the counted data reaches the value of the data Dt1, the RS flip-flop 166 is reset by the output of a comparator 170.

An AND gate 171 obtains a logical product signal from the output of the comparator 165 which is as shown in FIG. 11(a) and the $\overline{Q}$ output of the flip-flop 166 which is as shown in FIG. 11(b). The logical product signal thus obtained is supplied to an OR gate 172. When the level of the $\overline{Q}$ output of the RS flip-flop 166 again changes to a high level, the counter 168 is reset. This time, an RS flip-flop 173 is triggered. Then, after the lapse of a predetermined period of time T2, the RS flip-flop 173 is reset, in the same manner as mentioned above, jointly by a counter 174 which counts the A/D converting clock pulses, a data generating circuit 175 which generates data Dt2 corresponding to the period of time T2 and a comparator 176 which compares the data produced from the counter 174 and the data generating circuit 175. The RS flip-flop 173 thus produces a Q output which is as shown in FIG. 11(c). When the level of this Q output changes to a low level, the counter 174 is reset via an inverter 177. The output of the RS flip-flop 173 and the output of the AND gate 171 are supplied to an OR gate 172 to obtain a signal which is as shown in FIG. 11(d).

In the case of FIGS. 11(a) to 11(d), the period of the mute state is longer than a period of time T1+T2. Assuming that the mute period is T, a period of time T3 during which the output of the OR gate 172 remains at a high level can be expressed as T3=T−T1. In the event of T1<T<T2+T1, the period T3 is equal to T2, as is apparent from the illustration of FIGS. 11(a) to 11(d). In the case of T<T1, the period T3 becomes zero.

The output of the OR gate 172 is a signal similar to the signal produced from the AND gate 74 of FIG. 6 and is supplied via a terminal 178 to the PCM audio signal processing circuit 30.

A leader search operation by means of a signal obtained from the ID reading circuit 118 of FIG. 8 is arranged to be performed as follows: FIG. 12 shows by way of example the details of arrangement of the leader search control part of the ID detection circuit 52 of FIG. 9. Referring to FIG. 12, the output of the above-stated ID reading circuit 118 is supplied to a terminal 122. The PG signal mentioned in the foregoing is supplied to a terminal 121. A one-shot multivibrator 123 is arranged to form a pulse at every 1/60 sec. in synchronism with the PG signal and supplies it to AND gates 125 and 127. Meanwhile, when the terminal 122 receives pulses from the circuit 118, a retriggerable monostable multivibrator 124 is triggered. In case that these pulses are received at intervals of 1/60 sec., the output level of the retriggerable monostable multivibrator 124 remains high during that period. If this period of time T3 is set at a length during which the head can trace at least four times (4n/60 sec.), four pulses can be obtained from the AND gate 125 during a period corresponding to the period T3. During a period other than the period corresponding to the period T3, pulses are obtained from the AND gate 127.

When four pulses are consecutively obtained from the AND gate 125, a counter 128 supplies its Q output at a high level to a counter 131. The pulse from the AND gate 127 resets the counter 128 via an OR gate 129. The counter 128 remains in the reset state for a while (several seconds, for example) after the change of the level of the Q output to a high level. This effectively prevents erroneous detection of a mute part and erroneous counting due to lengthiness of the mute part.

The data DA designates a sequential position of a desired tune. When the counted data produced from the counter 131 comes to coincide with the data DA, a comparison circuit 132 produces a high level output to trigger a monostable multivibrator 133. The output of the monostable multivibrator 133 is supplied via a terminal 134 to the capstan motor control circuit 20 of FIG. 9. Upon receipt of this, the circuit 20 operates to bring the travel of the tape to a stop.

With the tape recorder arranged to perform digital recording in the manner described above, a search for a recorded audio signal and detection thereof can be accomplished without recourse to a manual operation of the operator. The look-up data to be used for that purpose is arranged to be formed after the incoming analog audio signal has been digitized. Therefore, the mute part can be always detected at a stabilized level. Further, the look-up data is arranged to be formed at a timing according to the A/D converting clock pulses. Therefore, the look-up data can be formed at a stable timing without recourse to any additional clock pulses.

In each of the embodiments described, the tape recorder of the kind forming six areas extending in the longitudinal direction of the tape and forming recording tracks one after another in each of these areas. However, the applicable range of this invention is of course not limited to the tape recorders of that kind. The invention is likewise applicable to DAT's and digital VTR's of the known kinds.

What is claimed is:

1. A data recording apparatus comprising:
   (a) designation means for designating one of an l number of parallel areas, said areas extending in the longitudinal direction of a tape-shaped recording medium, respectively;
   (b) data recording means including a rotary head arranged to obliquely trace said recording medium, said recording means being arranged to record data while forming many parallel recording tracks in one of said "l" number of areas designated by said designation means;
   (c) means for forming, by sampling a main information signal, first binary data of an "n" number of bits, where "n" is an integer;
   (d) means for forming second binary data of the "n" number of bits including binary data of an "m" number of bits where $2^m > 1$, which indicates one of said "l" number of areas designated by said designation means, said "m" number of bits of binary data never simultaneously becoming "0"; and
   (e) means for forming a data sequence including said first and second binary data and for supplying said data sequence to said recording means.

2. An apparatus according to claim 1, wherein said recording means is capable of setting a plurality of different track pitches for said many tracks; and said second binary data includes data indicative of said track pitch.

3. An apparatus according to claim 1, further comprising:
   moving means for moving said tape-shaped recording medium in the longitudinal direction thereof.

4. An apparatus according to claim 3, wherein said second binary data includes data indicative of the direction in which said moving means moves said tape-shaped recording medium.

5. An apparatus according to claim 1, further comprising means for forming a third binary data of the "n" number of bits which includes time information.

6. An apparatus according to claim 5, wherein said third binary data is arranged to show one figure portion of decimal value data with every four bits.

7. An apparatus according to claim 6, wherein said four bits of data showing one figure portion of decimal value data never simultaneously become "0".

8. An apparatus according to claim 1, wherein said main information signal includes an audio signal; and said first data of the "n" number of bits is arranged to have all the bits thereof become "0" except at least a most significant bit for indicating an average level of said audio signal.

9. An apparatus according to claim 8, further comprising means for reproducing said data sequence from one of the "l" number of areas of said tape-shaped recording medium.

10. An apparatus according to claim 9, further comprising means for detecting a data error of said data sequence after reproduction thereof by said reproducing means.

11. An apparatus according to claim 10, further comprising means for replacing the binary data of the "n"

number of bits when the data is detected as in error by said detecting means with data of "n" number of bits in which all the bits except the most significant bit are "0".

12. An apparatus according to claim 1, wherein l=6 and m=3.

13. An apparatus according to claim 12, wherein the above mentioned binary data of m bits are one of 6 kinds of bit patterns excluding 000, 111.

* * * * *